(12) United States Patent
Weston et al.

(10) Patent No.: US 12,441,334 B2
(45) Date of Patent: Oct. 14, 2025

(54) BEV POWERTRAIN/STEERING CONTROLS FOR ENHANCED STABILITY ON INCLINED SURFACES

(71) Applicant: Ford Global Technologies, LLC, Dearborn, MI (US)

(72) Inventors: Keith Weston, Canton, MI (US); Brendan Diamond, Grosse Pointe, MI (US); Jonathan Hair, Royal Oak, MI (US); David Michael Russell, Ann Arbor, MI (US); Matthew Johnson, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 444 days.

(21) Appl. No.: 17/858,524

(22) Filed: Jul. 6, 2022

(65) Prior Publication Data

US 2024/0010207 A1 Jan. 11, 2024

(51) Int. Cl.
*G01C 21/00* (2006.01)
*B60W 40/13* (2012.01)

(52) U.S. Cl.
CPC ..... *B60W 40/13* (2013.01); *B60W 2040/1315* (2013.01); *B60W 2520/30* (2013.01); *B60W 2520/403* (2013.01); *B60W 2520/406* (2013.01)

(58) Field of Classification Search
CPC ..... B60W 2040/1315; B60W 2520/30; B60W 2520/403; B60W 2520/406
See application file for complete search history.

(56) References Cited

U.S. PATENT DOCUMENTS

| | | | |
|---|---|---|---|
| 7,165,008 B2 | 1/2007 | Choi | |
| 7,640,081 B2 | 12/2009 | Lu et al. | |
| 2007/0078581 A1 | 4/2007 | Nenninger et al. | |
| 2012/0046846 A1* | 2/2012 | Dollens | B60K 17/356 701/99 |
| 2018/0100779 A1* | 4/2018 | Steinlage | B60W 40/13 |
| 2021/0197778 A1* | 7/2021 | Shi | B60T 8/1761 |

FOREIGN PATENT DOCUMENTS

| | | |
|---|---|---|
| CN | 113619564 A | 11/2021 |
| WO | 2009149974 A1 | 12/2009 |

* cited by examiner

*Primary Examiner* — Adam M Alharbi
(74) *Attorney, Agent, or Firm* — Burr & Forman; Lorne Forsythe (57) ABSTRACT

A vehicle control system may include a sensor network sensing vehicle attitude information and a controller operably coupled to the sensor network to determine, based on the vehicle attitude information, movement of a center of gravity of the vehicle relative to an axis of rotation of the vehicle. The controller may further determine a modification to a torque application of the vehicle based on the movement of the center of gravity of the vehicle relative to the axis of rotation of the vehicle.

18 Claims, 7 Drawing Sheets

BEV POWERTRAIN/STEERING CONTROLS FOR ENHANCED STABILITY ON INCLINED SURFACES

TECHNICAL FIELD

Example embodiments generally relate to vehicle control algorithms and, more particularly, relate to a system and method for providing management of torque applications to maintain stability for BEVs on inclined surfaces.

BACKGROUND

Many vehicle drivers enjoy operating their vehicles in off road conditions. Consequently, an entire market has developed for vehicles that excel in operating in off road environments. These environments may cause drivers to encounter challenging surfaces (e.g., sand, snow, rock, etc.), which may in some cases also be inclined to varying degrees. While this operating environment had historically been the operating territory of internal combustion engine (ICE) vehicles, electric vehicles (EVs) and even battery electric vehicles (BEVs), are now entering this scene.

BEVs are capable of providing unique opportunities for torque control, and therefore also tractive capability. Thus, it may be desirable to harness these capabilities to the advantage of drivers for enhanced stability including, as is the case for this disclosure, on inclined surfaces.

BRIEF SUMMARY OF SOME EXAMPLES

In accordance with an example embodiment, a vehicle control system for a vehicle may be provided. The vehicle control system may include a sensor network sensing vehicle attitude information and a controller operably coupled to the sensor network to determine, based on the vehicle attitude information, movement of a center of gravity of the vehicle relative to an axis of rotation of the vehicle. The controller may further determine a modification to a torque application of the vehicle based on the movement of the center of gravity of the vehicle relative to the axis of rotation of the vehicle.

In another example embodiment, a method of maintaining stability of a vehicle operating on an inclined surface may be provided. The method may include receiving vehicle attitude information, determining proximity to a stability threshold based on the vehicle attitude information, modifying a torque application associated with propulsion or steering of the vehicle based on the proximity to the stability threshold, determining an effect of the modifying the torque application, and, responsive to no change or reduction in the proximity to the stability threshold, providing additional torque application modification associated with the propulsion or the steering of the vehicle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
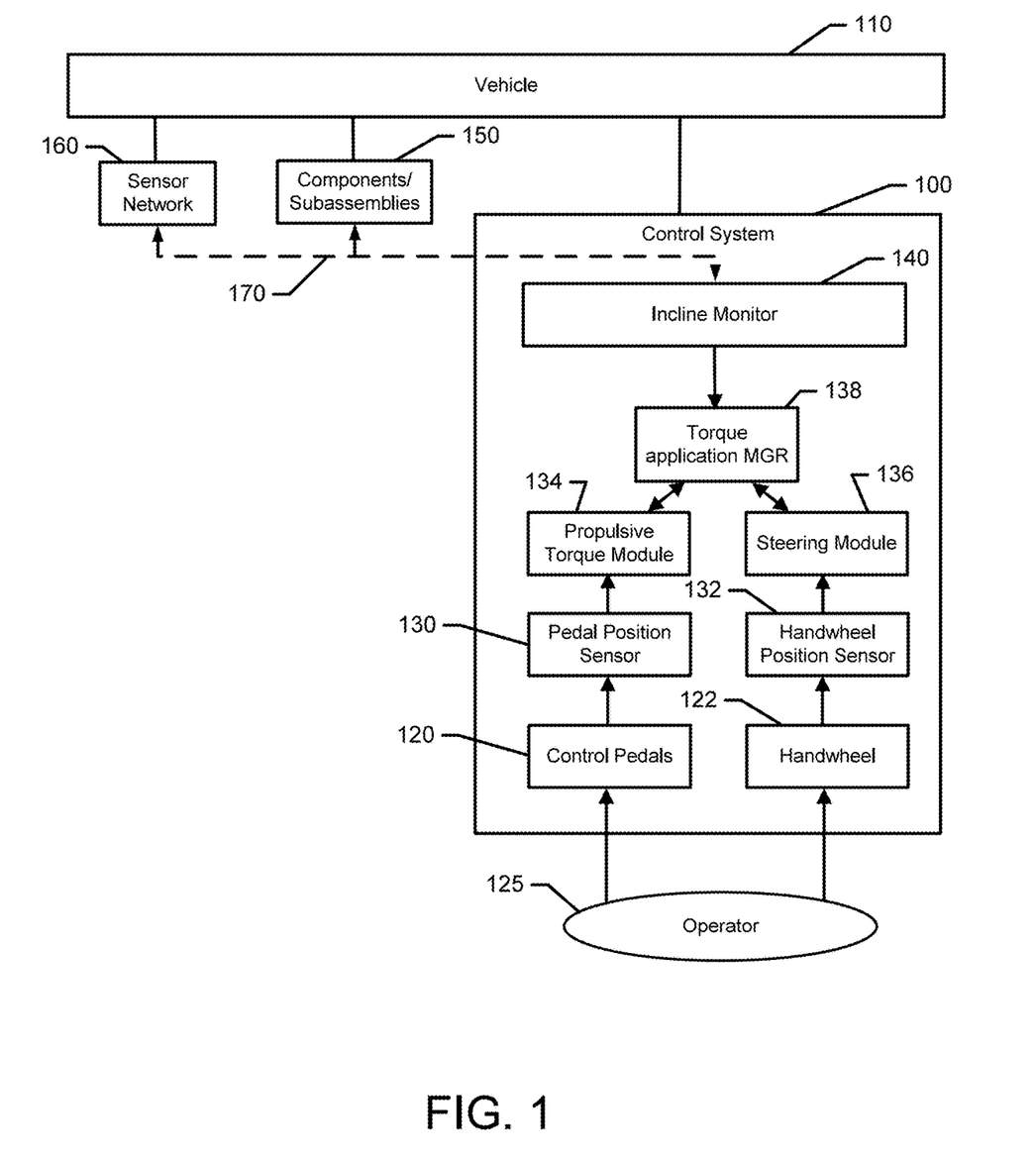
FIG. 1 illustrates a block diagram of a vehicle control system in accordance with an example embodiment.

FIG. 1 illustrates a block diagram of a vehicle control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include one or more input devices in the form of one or more control pedals, wheels, buttons, levers, etc. In some embodiments, the control pedals may include a foot-operated brake pedal and/or gas pedal. The brake and gas pedals may, more generally, be pedals or controllers for providing negative and positive propulsive torque inputs and may therefore be referred to as control pedals 120. However, the control pedals 120 could alternatively be hand operated or any other operable member via which an operator 125 may provide an input indicative of an intent of the operator 125 relative to controlling the provision of positive and negative torque for application to the wheels of the vehicle 110. Another example input device may include a steering wheel (or handwheel 122). The handwheel 122 may be rotatable by the operator 125 to provide an input indicative of an intent of the operator 125 relative to controlling a direction of travel of the vehicle 110, typically through control of the turning of the front wheels of the vehicle 110.

The control system 100 may also include position sensors for each of the control pedals 120 (each of which may have a corresponding pedal position sensor 130) and the handwheel 122 (which may have a corresponding handwheel position (or angle) sensor 132). The brake pedal position sensor 130 and the handwheel position sensor 132 may provide data indicative of the precise position of the control pedals 120 and the handwheel 122 to a propulsive torque module 134 and a steering module 136, respectively.

The propulsive torque module 134 may include portions or sub-modules associated with braking torque (or negative torque) and positive torque. The negative torque may be applied via an anti-lock brake system (ABS) and/or a brake boost system that are operably coupled to braking components or other components capable of providing a negative torque. Brake boost systems are commonly used in automotive settings in order to increase the actuation force from a driver's foot on the brake pedal to acceptable levels in order to properly engage a vehicle's brakes. Newer vehicles are now often equipped with various automated driver assistance features such as electric brake boost (EBB) systems to take the place of the conventional vacuum style brake boost system. EBB systems therefore determine a driver's braking demand and adjust the braking force accordingly. Alternatively, electro mechanical brakes (EMB) may be employed for the application of negative torque. In short, the ways via which negative torque may be applied are numerous and the details of each way is outside the scope of this disclosure.

Similarly, the propulsive torque module 134 may include many different ways of providing positive torque to the wheels of the vehicle 110, and the details of those individual ways are outside the scope of this disclosure. However, in an example embodiment, the propulsive torque module 134 may be designed to include one or two electric motors associated with the front wheels and the rear wheels of the vehicle 110 to provide positive torque to the front and rear wheels. Thus, for example, a single electric motor may provide positive torque to each of the front wheels, and a single electric motor may provide positive torque to each of the rear wheels. Alternatively, two motors may be provided to separately provide positive torque to each respective one of either the front or rear wheels. In any case, the propulsive torque module 134 may be capable of controlling the application of propulsive torque, including positive and negative torque, to the front wheels, either individually or as a pair, and to the rear wheels, either individually or as a pair.

The steering module 136 may include power steering, steer-by-wire or other electronically controlled or enhanced functions that translate movement of the handwheel 122 to corresponding turning of the front wheels (or other steering input wheels) of the vehicle 110. However, it should be appreciated that the steering module 136 may also operate without the handwheel 122 in autonomous vehicle contexts. The steering module 136 may provide the application of steering torque to turn the front wheels based on the handwheel position sensor 132, when the handwheel 122 is employed, or based on other guidance sensors in autonomous vehicle contexts. Thus, the steering module 136 can also be seen to manage the application of torque (albeit in a steering context instead of propulsive context).

Generally speaking, the control of the application of propulsive torque provided by the propulsive torque module 134 is based at least in part on the positions of the control pedals 120 (or other control inputs in autonomous vehicle contexts). However, as will be discussed in greater detail below, example embodiments may further employ a torque application manager 138 (or management module) and an incline monitor 140 to further facilitate managing torque applications (including steering and propulsion applications) for maintaining vehicle stability. In particular, for example, the torque application manager 138 may determine vehicle attitude (e.g., based on inputs from the incline monitor 140) in order to manage torque application for the maintenance of stability of the vehicle 110 on inclined surfaces.

Vehicle attitude may be defined as the orientation of the vehicle 110 relative to the normal direction of travel (which may be assumed to be on a flat horizontal surface). Thus, the vehicle attitude may be normal whenever the vehicle is operating on a flat surface, and the vehicle attitude may change in the x-z plane when encountering an up or down slope directly ahead of or behind the vehicle. These changes in the x-z plane are referred to as pitch. The vehicle attitude may also change in the y-z plane when encountering side slopes, which tend to slope normal to the direction of travel of the vehicle 110. These changes in the y-z plane are referred to as roll. Any twisting of the vehicle 110 about the z axis may be referred to as yaw. The vehicle 110 may also encounter varying degrees of yaw, pitch and roll at the same time, and the combination of these effects causes corresponding changes in orientation of the vehicle 110 that can be referred to as vehicle attitude.

In an example embodiment, the control system 100 may receive information that is used to determine vehicle status from various components or subassemblies 150 of the vehicle 110. The components or subassemblies 150 may include the control pedals 120, the handwheel 122 and any number of other components. The components or subassemblies 150 may also include, for example, a braking system, a propulsion system, a steering system, and/or a wheel assembly of the vehicle 110. The braking system may be configured to provide braking inputs to braking components of the vehicle 110 (e.g., electro-mechanical brakes, hydraulic brakes, regenerative brakes, etc.) based on a negative torque determined by the propulsive torque module 134. The braking system may also include more than one type of braking hardware. For example, the braking system of the vehicle 110 may include respective instances of, or a combination of, friction brakes, hydraulic brakes and electro-mechanical brakes. The propulsion system may include one or more instances of an electric motor, or any other suitable propulsion device. In some cases, the propulsion system may also incorporate drive-by-wire components and a corresponding control paradigm. The steering system may include the handwheel 122 and the steering module 136 described above and, in some cases may include an electric power assisted steering (EPAS) system. In some embodiments, the EPAS system may employ an electric motor that applies torque to a gear assembly that is operably coupled to the front wheels. Thus, the torque applied to the front wheels may be controlled via the EPAS system.

Additionally or alternatively, various sensors that may be operably coupled to the components or subassemblies 150 may be included, and may provide input to the control system 100 that is used in determining vehicle status. Such sensors may be part of a sensor network 160 and sensors of the sensor network 160 may be operably coupled to the control system 100 (and/or the components or subassemblies 150) via a vehicle communication bus (e.g., a controller area network (CAN) bus) 170. Thus, many of the signals provided to the torque application manager 138 and/or incline monitor 140 may be provided via the vehicle communication bus 170 (or CAN bus). By monitoring the CAN bus, the torque application manager 138 and/or incline monitor 140 may determine vehicle attitude to maintain vehicle stability by managing torque applied in the propulsive torque module 134 and the steering module 136. Moreover, one or more corresponding sensors of the sensor network 160 that may be operably coupled to other modules of the vehicle 110 may also provide input information to the torque application manager 138 and/or incline monitor 140 for consideration and control thereby.

The sensors may include the pedal position sensors 130, the handwheel position sensor 132, and any number of other sensors. In some cases, the sensors may include a gyroscope, ride height sensors, pitch rate sensors, roll rate sensors, an inertial measurement unit (IMU), RCM or other sensors for measuring motion and/or inclination of the vehicle (e.g., orientation) in the various directions to determine vehicle attitude. The sensors of the sensor network 160 may also include sensors for detecting vehicle speed, output torque, or other useful parameters. Any of all of the parameters measured may be communicated to the incline monitor 140, which may utilize the parameters received to determine, perhaps among other things, the vehicle attitude. Thus, the incline monitor 140 may be capable of determining when the vehicle 110 is headed uphill, downhill, or is inclined on a side slope either to the right or left side of the vehicle 110, or whether more complicated combinations of incline are being encountered. The incline monitor 140 may communicate parameters from the sensor network 160 and/or determinations regarding vehicle attitude to the torque application manager 138 as what may be generally referred to as attitude information.

The torque application manager 138 may utilize the attitude information received from the sensor network 160 and/or the incline monitor 140 to manage torque applications associated with the steering module 136 and the propulsive torque module 134 to enhance vehicle stability based on vehicle attitude as described in greater detail below. Although the interactions between the incline monitor 140, the torque application manager 138, the steering module 136 and the propulsive torque module 134 could vary in different example embodiments, and the componentry could be operably coupled together in various different ways, FIG. 2 illustrates one example structure that may be used to implement an example embodiment.

Accordingly, for example, the control system 100 may be able to receive numerous different parameters, indications and other information (e.g., including center of gravity and/or attitude information) that may be related to or indicative of different situations or conditions associated with vehicle status. The control system 100 may also receive information indicative of the intent of the operator 125 relative to control of various aspects of operation of the vehicle 110 and then be configured to use the information received to manage (e.g., via the torque application manager 138) application of torque to the steering module 136 and/or the propulsive torque module 134 to maintain good stability even on inclined surfaces. Although not necessarily required, the control system 100 may also be capable of determining situations where one or more wheels are potentially lifted or lightly loaded. To accomplish this, small brake pulses may be applied to a wheel to determine whether such wheels are in fact slowed and how quickly they return to vehicle speed. A brake pulse that quickly slows a wheel and then very slowly returns to vehicle speed would indicate that the wheel is very lightly loaded, while if the same pulse only barely changed the wheel speed and the wheel sped up quickly to vehicle speed as soon as brake pressure was released would indicate contact with the ground. Motor torque could also or alternatively be employed in similar fashion to determine lightly loaded wheels. The control system 100 of FIG. 1 may be similar to conventional systems in many respects, except that, the control system 100 (and in some cases specifically torque application manager 138) may be modified to respond to situations in which operation on an inclined surface is detected as described in greater detail in reference to FIGS. 2-8 below.

Figure 2:
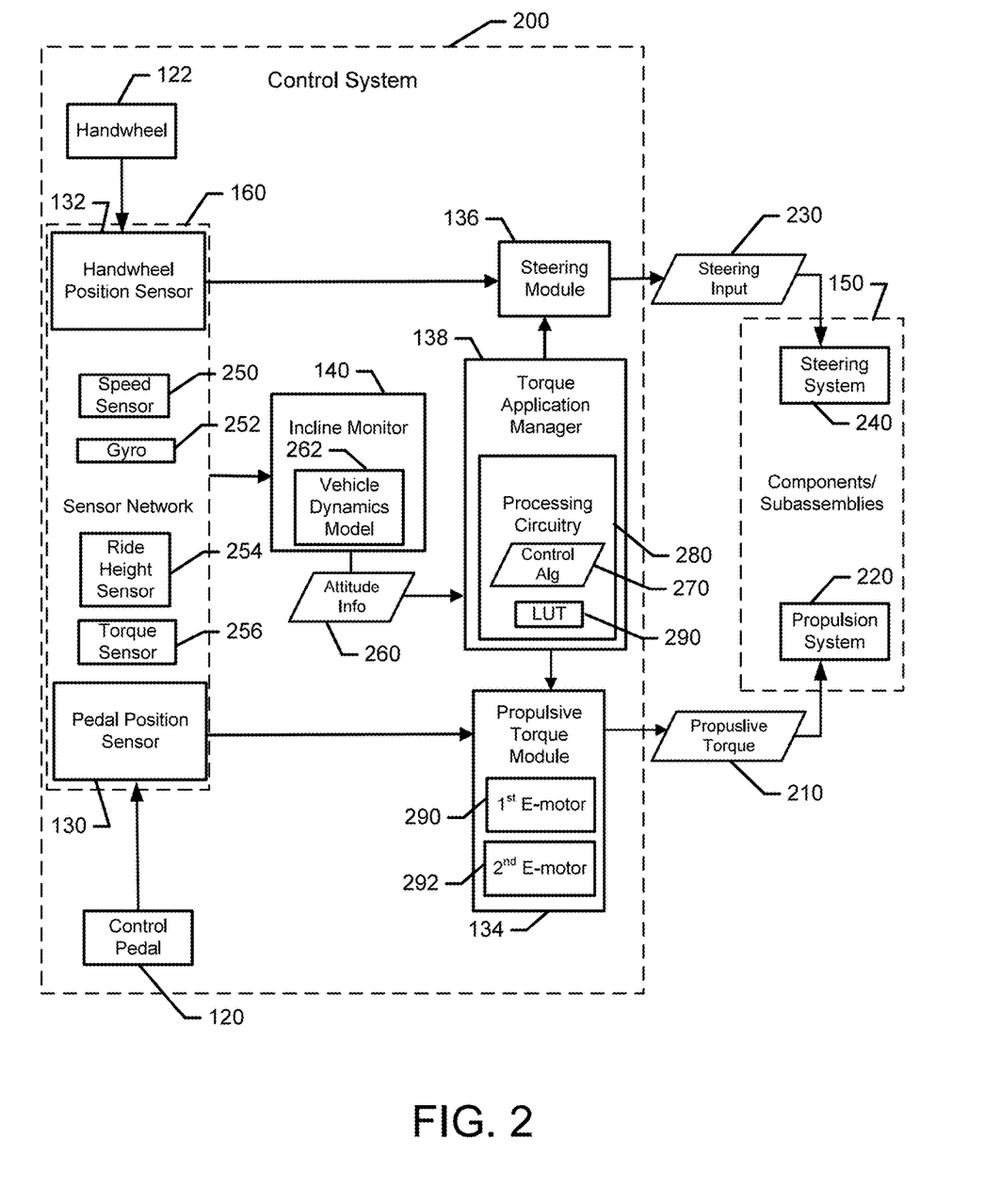
FIG. 2 illustrates a block diagram of some components of the vehicle control system of FIG. 1 in accordance with an example embodiment.

FIG. 2 illustrates a block diagram of various components of a control system 200 (which is a specific example of control system 100 of FIG. 1) in greater detail. In this regard, for example, FIG. 2 illustrates various ones of the components of FIG. 1 in a particular arrangement in which the torque application manager 138 and the incline monitor 140 are shown as separate components or modules. However, it should be appreciated that the torque application manager 138 and the incline monitor 140 may, in some cases, be the same module.

As shown in FIG. 2, the control system 200 may include the control pedal 120, which may have the corresponding pedal position sensor 130, and the handwheel 122, which may have the associated handwheel position sensor 132. The propulsive torque module 134 may produce a propulsive torque request 210 to a propulsion system 220 based on the pedal position sensor 130 input provided from the control pedal 120. Similarly, the steering module 136 may generate a steering input 210 to a steering system 240 based on the handwheel position sensor 132 input provided from the handwheel 122. Under normal driving conditions, inputs from the operator 125 may be provided at the control pedal 120 and handwheel 122, and inputs from the respective sensors (e.g., the pedal position sensor 130 and the handwheel position sensor 132) may be provided to the propulsive torque module 134 and the steering module 136, respectively. The steering system 240 and the propulsion system 220 may include any of the components mentioned above in connection with describing such systems, along with other components that are outside the scope of this disclosure. Example embodiments may augment this normal situation by sensing when the vehicle 110 is operating on an incline, and may manage torque application in steering applications and propulsive applications to maintain stability of the vehicle 110.

As shown in FIG. 2, the sensor network 160 may include additional sensors such as, for example, a speed sensor 250, a gyro (or gyroscope) 252, ride height sensors 254 (e.g., at each respective vehicle corner), and a torque sensor 256. These sensors (among perhaps others) may provide information to the incline monitor 140 to enable the incline monitor 140 to generate the attitude information 260, as mentioned above. In an example embodiment, incline monitor 140 may employ one or more models of vehicle dynamics stored at or otherwise accessible to the incline monitor 140 to determine the attitude information 260. In some cases, in order to determine how the changes in data provided by the sensors mentioned above influence movement of a center of gravity of the vehicle 110 (and therefore also influence stability), the incline monitor 140 may reference a vehicle dynamics model 262. Thus, for example, the incline monitor 140 may use the vehicle dynamics model 262 to determine, for the current vehicle attitude and vehicle speed and/or output torque, the likely position of the center of gravity of the vehicle 110. In this regard, the vehicle dynamics model 142 may plot or determine a location of the center of gravity of the vehicle 110 for each combination of vehicle attitude vs. vehicle speed (and/or output torque). Thus, effectively, the incline monitor 140 may provide a continuously updated indication of the location of the center of gravity of the vehicle 110.

The attitude information 260 may include the indication of the location of the center of gravity, and/or any additional information from the sensors mentioned above (or other sensors), which may be provided to the torque application manager 138. In an example embodiment, the torque application manager 138 may receive inputs indicating vehicle speed and vehicle attitude from the incline monitor 140 (or from the sensor network 160 itself) and/or the location of the center of gravity of the vehicle 110, all or a portion of which may in some cases be referred to as the attitude information 260. The torque application manager 138 may also receive torque information indicating the current output propulsive torque (e.g., net torque of the positive and negative torque inputs provided by the propulsive torque module 134) and inputs indicating the application of torque to the steering module 136. Based on the attitude information 260, which may include any or all of these inputs, the torque application manager 138 may determine proximity of the center of gravity of the vehicle 110 to a stability threshold.

In some example embodiments, the torque application manager 138 may execute a control algorithm 270 via processing circuitry 280 (e.g., a processor and memory) of the torque application manager 138 in order to utilize the attitude information 260 to maintain stability on inclined surfaces. In this regard, for example, the control algorithm 270 may define operations for detecting situations that should trigger a response to manage torque applications to the steering module 136 and the propulsive torque module 134 in ways that enhance or maintain stability of the vehicle 110. Stability of the vehicle 110 may be compromised in situations in which the center of gravity is moved over an axis of rotation of the vehicle 110. The axis of rotation is often a contact patch of tires in contact with the ground, or an axle of such tires. Thus, in order to maintain stability of the vehicle 110, the control algorithm 270 may be configured to detect the situation in which the center of gravity approaches a point directly above the axis of rotation of the vehicle 110.

As noted above, the attitude information 260 may include information indicative of the current location of the center of gravity of the vehicle 110 (or at least information sufficient to determine the same). The attitude information 260 may also include information about the orientation of the vehicle 110 relative to pitch, roll, yaw, or combinations thereof. The attitude information 260 may further include or be augmented with information regarding vehicle speed or current output torque. All of these, when provided to the control algorithm 270 may be used to determine whether to intervene by managing torque applications, and if so, how to intervene.

In an example embodiment, the processing circuitry 280 may include or have access to a lookup table (LUT) 290, which may define relevant calibration limits related to vehicle inertial measurement facility data to provide vehicle center of gravity and inertial properties. The lookup table 290 may be created during vehicle development to define acceptable proximity values (or stability thresholds) that should be maintained in order to ensure vehicle stability on inclined surfaces. The lookup table 290 may, for example, include a proximity between the center of gravity and the axis of rotation of the vehicle that, when reached cause the torque application manager 138 to change torque applications involving the steering module 136 or the propulsive torque module 134 for maintaining stability. In some embodiments, a function or derived relationship providing similar information, utility and capability to the lookup table 290 may alternatively be used.

The lookup table 290 may, in some cases, enable the outputs generated to consider loading on the vehicle 110. Thus, for example, the ride height sensors mentioned above, or other sensors capable of detecting information indicative of vehicle loading may allow consideration of loading when applying controls as described herein. In the case of propulsive torque, for example, the torque application manager 138 may, via the control algorithm 270, control (or modify) a torque split between front and rear axles (e.g., by shifting torque application between a first electric motor 292 associated with a front axle of the vehicle 110 and a second electric motor 294 associated with a rear axle of the vehicle 110). Such an example is explained more explicitly in reference to FIGS. 4 and 5 below, and an example involving lateral incline is described in reference to FIGS. 6 and 7. However, in the meantime, a general operation of the control algorithm 270 (i.e., not specific to any particular incline) will be discussed in reference to FIG. 3.

Figure 3:
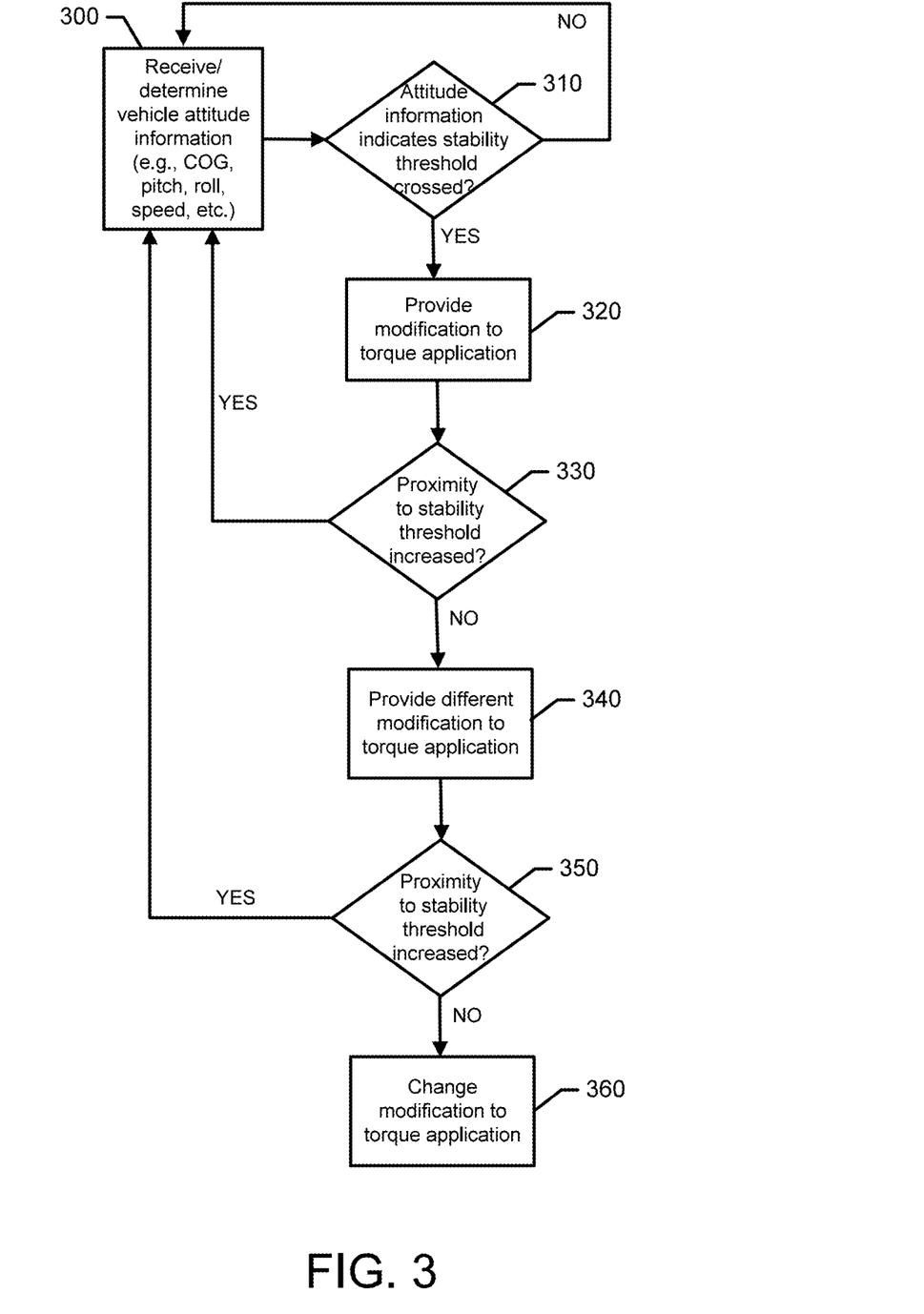
FIG. 3 illustrates a block diagram of operations that may be associated with execution of a control algorithm of an example embodiment.

FIG. 3 illustrates a block diagram of operations that may be associated with execution of the control algorithm 270 of an example embodiment. In this regard, at operation 300, the control algorithm 270 may receive (or in some cases be involved in determining) the vehicle attitude information. The vehicle attitude information may, as noted above, include information indicative of pitch, roll, vehicle speed, etc. and, in some cases may also include a determination of the location of the center of gravity of the vehicle. This information may be monitored to determine if the attitude information (or more specifically if the center of gravity movement or migration) indicates that the stability threshold has been crossed at operation 310. As noted above, the lookup table 290 may define an acceptable proximity of the center of gravity to the axis of rotation for the current vehicle speed, pitch, roll, output torque, etc. Thus, using the lookup table 290, the control algorithm 270 may be enabled to insert the current information provided via the attitude information 260 to determine whether the stability threshold has been crossed. If the stability threshold has not been crossed, flow may return to operation 300 for continued monitoring of the attitude information 260. If the stability threshold has been crossed, then action may be taken at operation 320 to respond to this situation.

In this regard, at operation 320, the control algorithm 270 may cause a modification to be made to torque application of the vehicle 110. As noted above, the modification to torque application may include modifications to the propulsive torque module 134 or to the steering module 136. Moreover, the modification to torque application may, in some cases, include torque vectoring aimed at maintaining vehicle stability on inclined surfaces. Some specific examples will be discussed in greater detail below.

After modifying the torque application at operation 320, a further determination may be made as to whether proximity to the stability threshold has increased at operation 330 by continued monitoring of the attitude information 260. If the proximity to the stability threshold has increased, then the action at operation 320 has had a positive effect on stability and routine monitoring at operation 300 may be resumed. However, if the proximity to the stability threshold has not increased, then a different modification to torque application may be made at operation 340. A second determination may be made at operation 350 as to whether proximity to the stability threshold has increased by continued monitoring of the attitude information 260. If the proximity to the stability threshold has increased, then the action at operation 340 has had a positive effect on stability and routine monitoring at operation 300 may be resumed. However, if the proximity to the stability threshold has again not increased, then a further change to the modification to torque application may be made at operation 360. It should also be appreciated that the sequence above assumes that the proximity measured stays on the same side of the stability threshold. If the stability threshold is crossed, more intervention may be applied as the proximity increases instead of less, so the paradigm discussed above may be reversed in such a situation.

Figure 4:
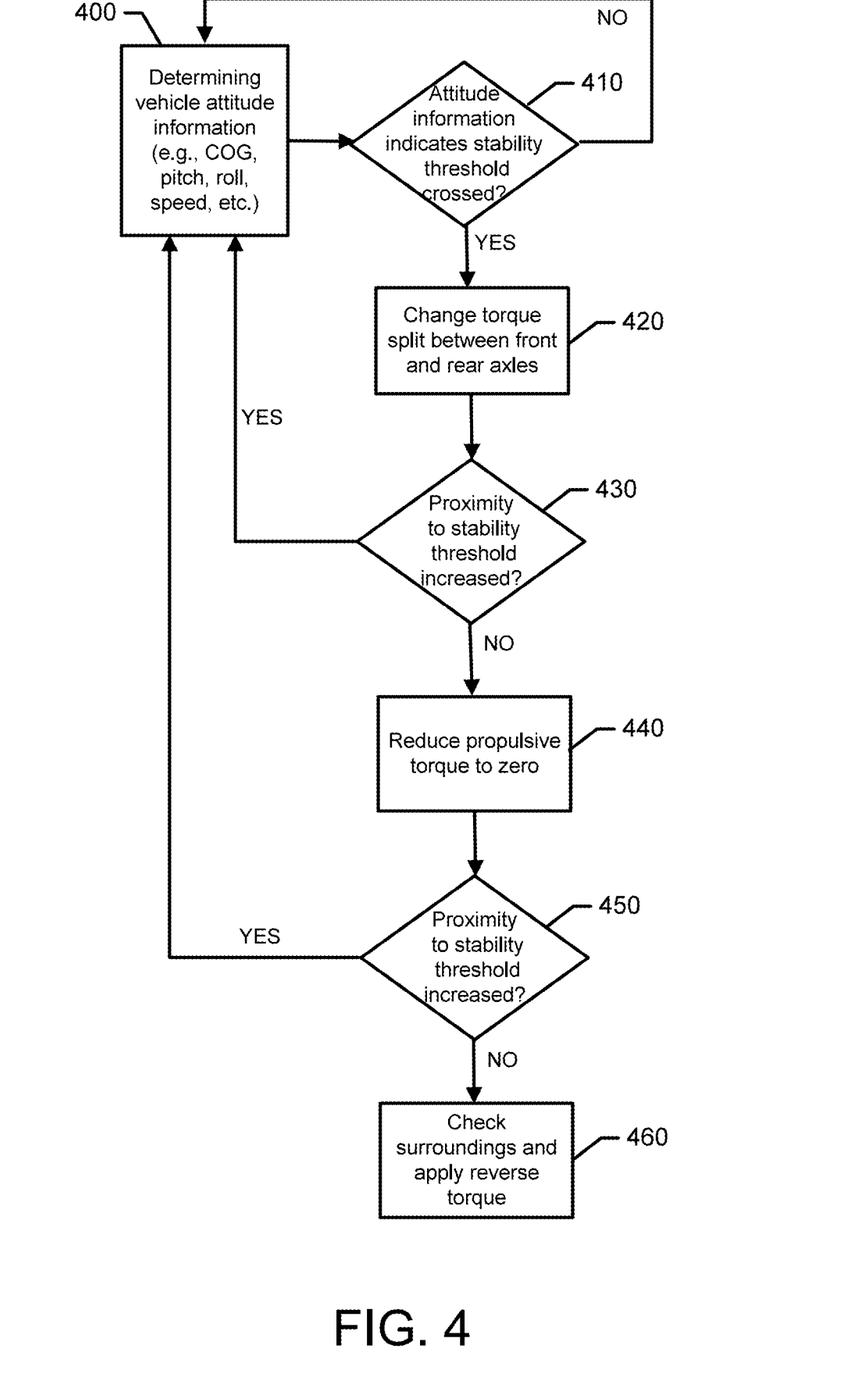
FIG. 4 is a block diagram of operations that may be associated with execution of the control algorithm on an inclined slope that causes the vehicle to pitch in accordance with an example embodiment.
Figure 5:
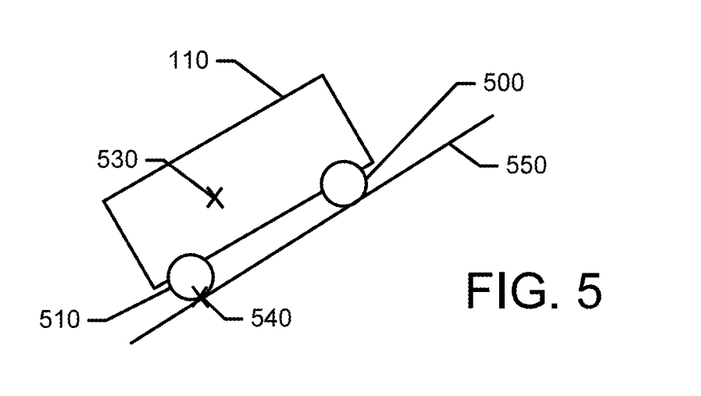
FIG. 5 is a schematic side view of the vehicle while on a pitch incline uphill in accordance with an example embodiment.

As noted above, the modification to torque application may be made in the context of steering applications or propulsion applications associated with the steering module 136 and the propulsive torque module 134. FIGS. 4 and 5 refer specifically to an example where the vehicle 110 is pitched on an uphill slope. In this regard, FIG. 4 is a block diagram of operations that may be associated with execution of the control algorithm 270 on an inclined slope that causes the vehicle 110 to pitch in accordance with an example embodiment. Meanwhile, FIG. 5 is a schematic side view of the vehicle 110 while on a pitch incline uphill. In this regard, at operation 400, the control algorithm 270 may receive (or in some cases be involved in determining) the attitude information 260. The attitude information 260 may, in this example, include information indicative of the amount of pitch (e.g., the angle of incline), vehicle speed, output torque, etc. The attitude information 260 may also include a determination of the location of the center of gravity of the vehicle under the current conditions.

As shown in FIG. 5, the attitude information 260 of this example, may indicate that the orientation of the vehicle 110 is such that the front wheels 500 are higher than the rear wheels 510. This confirms an uphill pitch of the vehicle 110. Of course, in an alternative scenario, the front wheels 500 could be lower than the rear wheels 510 thereby indicating a downhill pitch.

When the front wheels 500 are pitched higher than the rear wheels 510, as shown in FIG. 5, the vehicle 110 may be already in a similar orientation to that which exists when a vehicle performs a "wheelie". In such a situation, applying more torque to the rear wheels 510 may produce reactionary force through the contact patch of the rear wheels 510 that may tend the vehicle 110 to wheelie, which may move center of gravity 530 closer to vertically above the axis of rotation 540 formed at the contact patch of the rear wheels 510 with the inclined surface 550 on which the vehicle 110 is operating. As such, using the attitude information 260, the control algorithm 270 may determine that the vehicle 110 is oriented with an attitude that places the front wheels 500 higher than the rear wheels 510. The attitude information 260 may also provide information on the movement of the center of gravity 530 relative to the axis or rotation 540, which may be examined at operation 410.

In this regard, for example, the attitude information 260 may be monitored to determine if the center of gravity movement or migration indicates that the stability threshold has been crossed at operation 410. As noted above, the lookup table 290 may define an acceptable proximity of the center of gravity to the axis of rotation for the current vehicle speed, pitch, output torque, loading, etc. Thus, using the lookup table 290, the control algorithm 270 may be enabled to insert the current information provided via the attitude information 260 to determine whether the stability threshold has been crossed at operation 410. If the stability threshold has not been crossed, flow may return to operation 400 for continued monitoring of the attitude information 260. If the stability threshold has been crossed, then action may be taken at operation 420 to respond to this situation.

In this regard, at operation 420, the control algorithm 270 may cause a modification to be made to propulsive torque application of the vehicle 110. In an example embodiment, the modification may include a change in the torque split between front and rear axles. The lookup table 290 may include different values for the torque split that should be applied for the current situation. For example, higher speeds, less loading, or higher inclined surfaces, may cause larger torque splits to be initiated. Moreover, the torque modifications made may be more sensitive, more significant, or more responsive for a higher center of gravity. Thus, the lookup table 290 may define variable values for torque vectoring in corresponding different situations.

Thus, for this example, when the stability threshold is reached, which may define a proximity of the center of gravity 530 to a location vertically above the axis of rotation 540, the control algorithm 270 may define a shift in torque application between the front axle and the rear axle to counteract any potential wheelie effect by shifting a torque split between the front and rear axles forward. In other words, more torque will be applied to the front wheels 500 than to the rear wheels 510. As an example, whereas a nominal torque split may be 50/50 between front and rear axles, the control algorithm 270 may adjust the split to 80/20, with the higher amount of torque being applied to the up-slope side. Thus, in this example, instead of an equal torque split between the first electric motor 292 associated with a front axle of the vehicle 110 and the second electric motor 294 associated with a rear axle of the vehicle 110, 80% of the torque may be provided to the first electric motor 292 and 20% may be provided to the second electric motor 294. This arrangement may provide more torque farther away from the axis of rotation 540, and tend to counteract the wheelie effect, and enhance stability on the inclined surface. If the vehicle 110 was instead pitched downhill, the torque split would instead provide more torque to the downhill axle (i.e., the rear axle), and less to the front axle. In some cases, an alternative method may be employed, which may be to limit torque on the downhill axle to be less than the moment required to lift the uphill tire off the ground (vehicle mass estimate*moment arm from the center of gravity to the axis of rotation), which if the controller were attempting to maintain total torque would shift torque to the uphill wheel. This method may, in some ways, be simpler than employing a lookup table. Vehicle speed, bank, and vertical rate of change of velocity could also be factored into this method to take into account cresting a hill at speed or at the bottom of a valley at speed.

After modifying the torque split between front and rear axles at operation 420, a further determination may be made as to whether proximity to the stability threshold has increased at operation 430 by continued monitoring of the attitude information 260. If the proximity to the stability threshold has increased, then the action at operation 420 has had a positive effect on stability and routine monitoring at operation 400 may be resumed. However, if the proximity to the stability threshold has not increased, then the propulsive torque may be reduced to zero at operation 440. A second determination may be made at operation 450 as to whether proximity to the stability threshold has increased by continued monitoring of the attitude information 260. If the proximity to the stability threshold has increased, then the action at operation 440 has had a positive effect on stability and routine monitoring at operation 400 may be resumed. However, if the proximity to the stability threshold has again not increased, then a reverse torque may be applied at operation 460. In some embodiments, the sensor network 160 may include a rear camera, LIDAR, or other sensors to detect objects to the rear of the vehicle 110 before implementation of operation 460. Thus, no reverse operation may be permitted without verification of a clear path to the rear of the vehicle 110.

Figure 6:
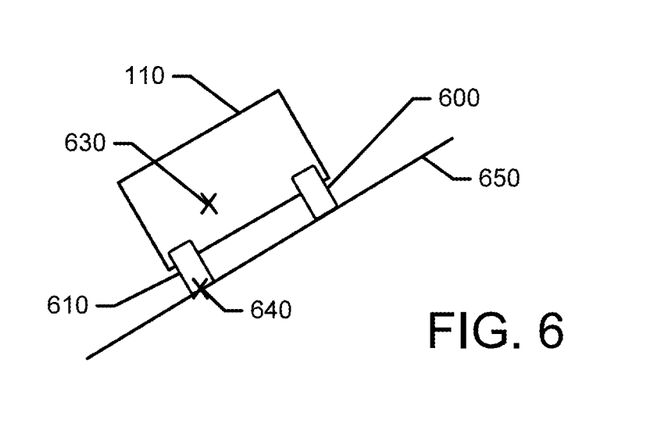
FIG. 6 is a schematic rear view of the vehicle while on a roll incline on a side hill in accordance with an example embodiment.
Figure 7:
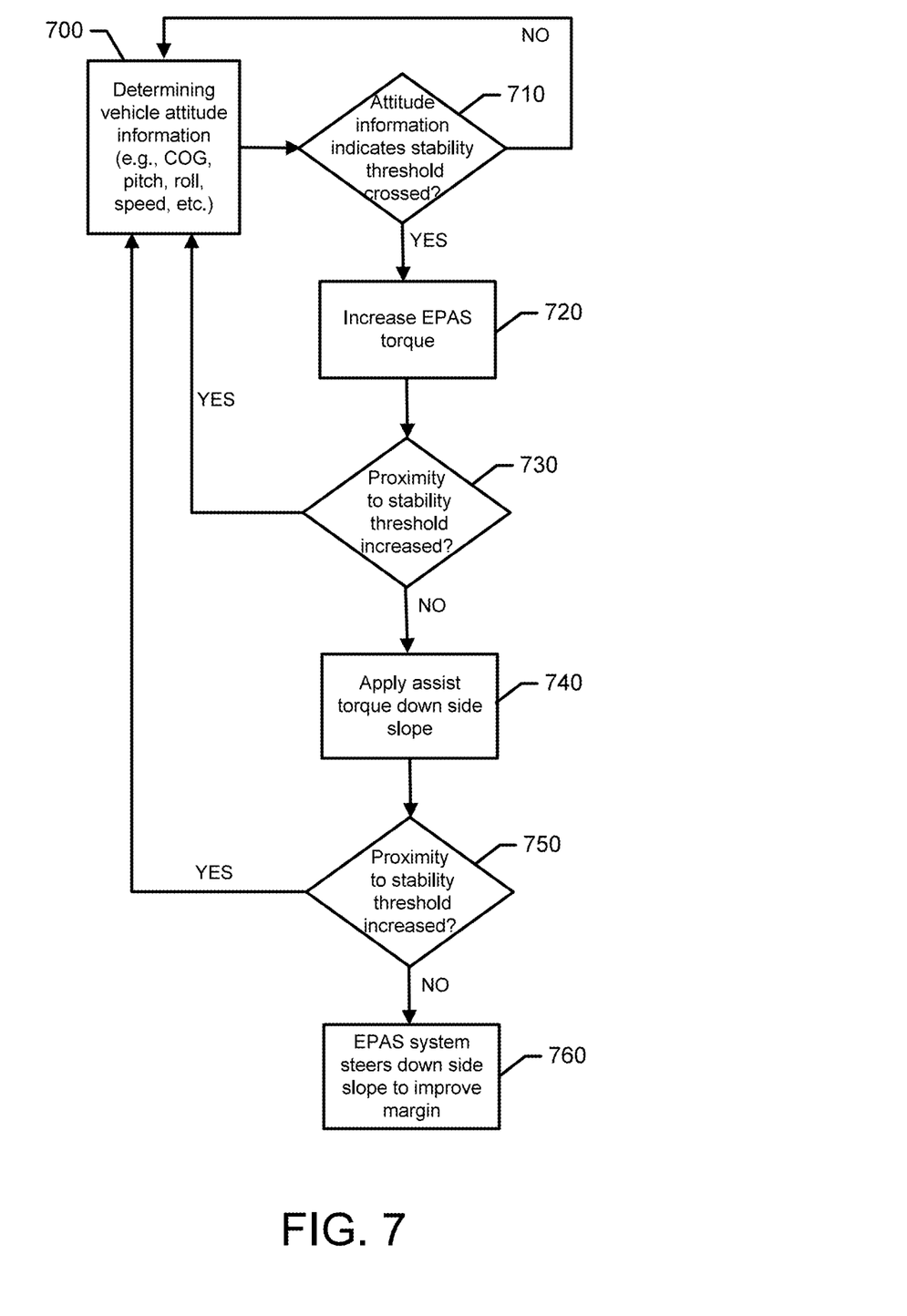
FIG. 7 is a block diagram of operations that may be associated with execution of the control algorithm on an inclined side slope in accordance with an example embodiment.
Figure 8:
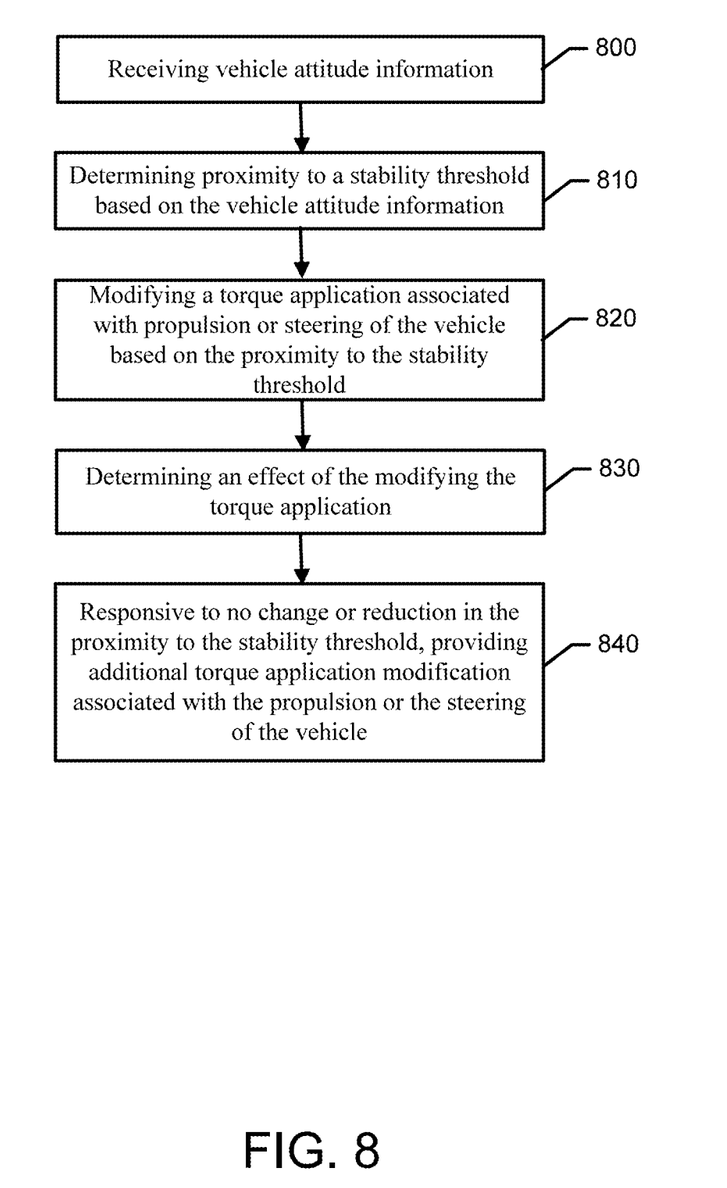
FIG. 8 illustrates a block diagram a method of maintaining stability of a vehicle operating on an inclined surface in accordance with an example embodiment.

FIGS. 6 and 7 refer specifically to an example where the vehicle 110 is pitched on an side slope. In this regard, FIG. 7 is a block diagram of operations that may be associated with execution of the control algorithm 270 on a side slope that causes the vehicle 110 to experience orientation in the roll direction in accordance with an example embodiment. Meanwhile, FIG. 6 is a schematic rear view of the vehicle 110 while on a roll incline side hill. In this regard, at operation 700, the control algorithm 270 may receive (or in some cases be involved in determining) the attitude information 260. The attitude information 260 may, in this example, include information indicative of the amount of roll (e.g., the angle of incline of the side hill), vehicle speed, output torque, etc. The attitude information 260 may also include a determination of the location of the center of gravity of the vehicle under the current conditions.

As shown in FIG. 6, the attitude information 260 of this example, may indicate that the orientation of the vehicle 110 is such that the right side wheels 600 are higher than the left side wheels 610. This confirms a roll condition on a side hill with the right side of the vehicle 110 higher than the left side of the vehicle 110. Of course, in an alternative scenario, the right side wheels 600 could be lower than the left side wheels 610 thereby indicating a roll condition on a side hill with the left side of the vehicle 110 higher than the right side of the vehicle 110.

When the right side wheels 600 are higher than the left side wheels 610, as shown in FIG. 6, the center of gravity 630 may migrate toward a location vertically above the axis of rotation 640 as the angle increases. As such, using the attitude information 260, the control algorithm 270 may determine that the vehicle 110 is oriented with an attitude that places the right side wheels 600 higher than the left side wheels 610, along with some indication of the magnitude of the angle of the side hill. The attitude information 260 may also provide information on the movement of the center of gravity 630 relative to the axis or rotation 640 over time, which may be examined at operation 710.

In this regard, for example, the attitude information 260 may be monitored to determine if the center of gravity 630 movement or migration indicates that the stability threshold has been crossed at operation 710. As noted above, the lookup table 290 may define an acceptable proximity of the center of gravity 630 to the axis of rotation 640 for the current vehicle speed, roll, output torque, etc. Thus, using the lookup table 290, the control algorithm 270 may be enabled to insert the current information provided via the attitude information 260 to determine whether the stability threshold has been crossed at operation 710. If the stability threshold has not been crossed, flow may return to operation 700 for continued monitoring of the attitude information 260. If the stability threshold has been crossed, then action may be taken at operation 720 to respond to this situation.

In this regard, at operation 720, the control algorithm 270 may cause a modification to be made to enhance steering performance of the vehicle 110. In an example embodiment, the modification may include a change in EPAS torque, which may enhance stability. For example, operation 720 may include an increase in EPAS torque. The lookup table 290 may include different values for the increasing the EPAS torque that can be applied for the current situation. For example, higher speeds, or higher inclined surfaces may cause larger increases in EPAS torque to be initiated. Thus, the lookup table 290 may define variable values for EPAS torque in corresponding different situations. Thus, for this example, when the stability threshold is reached, which may define a proximity of the center of gravity 630 to a location vertically above the axis of rotation 640, the control algorithm 270 may define a shift in torque application of the EPAS to maintain stability.

After modifying the EPAS torque at operation 720, a further determination may be made as to whether proximity to the stability threshold has increased at operation 730 by continued monitoring of the attitude information 260. If the proximity to the stability threshold has increased, then the action at operation 720 has had a positive effect on stability and routine monitoring at operation 700 may be resumed. However, if the proximity to the stability threshold has not increased, then application of assist torque down the side slope may be inserted to maintain stability at operation 740. A second determination may be made at operation 750 as to whether proximity to the stability threshold has increased by continued monitoring of the attitude information 260. If the proximity to the stability threshold has increased, then the action at operation 740 has had a positive effect on stability and routine monitoring at operation 700 may be resumed. However, if the proximity to the stability threshold has again not increased, then the EPAS system may steer down the side slope at operation 760 to enhance stability.

A vehicle control system for a vehicle may therefore be provided. The vehicle control system may include a sensor network sensing vehicle attitude information and a controller operably coupled to the sensor network to determine, based on the vehicle attitude information, movement of a center of gravity of the vehicle relative to an axis of rotation of the vehicle. The controller may further determine a modification to a torque application of the vehicle based on the movement of the center of gravity of the vehicle relative to the axis of rotation of the vehicle.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the attitude information may indicate that the vehicle is pitched up or down on an inclined surface, and the modification to the torque application may include altering a torque vectoring between wheels at the front, rear or side of the vehicle. In an example embodiment, the system may further include a first electric motor operably coupled to the front axle, and a second electric motor operably coupled to the rear axle. The torque split may be changed by maintaining total torque while increasing torque applied to the first electric motor and decreasing torque applied to the rear axle in response to the inclined surface having the front axle higher than the rear axle, or while decreasing torque applied to the first electric motor and increasing torque applied to the rear axle in response to the inclined surface having the front axle lower than the rear axle. In some cases, the system may further include a lookup table defining a plurality of torque split values corresponding to respective different measured parameters associated with the attitude information. In an example embodiment, the respective different measured parameters may include vehicle speed, pitch angle or output torque. In some cases, the controller may monitor for additional movement of the center of gravity of the vehicle relative to the axis of rotation of the vehicle responsive to the modification to the torque application and, in response to the center of gravity moving toward the axis of rotation, the controller may reduce propulsion torque to zero. In an example embodiment, the controller may monitor for further movement of the center of gravity of the vehicle relative to the axis of rotation of the vehicle responsive to the reduction of the propulsion torque to zero and, in response to the center of gravity moving toward the axis of rotation, the controller may direct application of torque in a reverse direction. In some cases, the sensor network may include a rear camera, radar or lidar, and the application of torque in the reverse direction may be enabled responsive to the rear camera, radar or lidar confirming an absence of an obstructing object behind the vehicle. In an example embodiment, the vehicle may employ electrical power assisted steering (EPAS), the attitude information may indicate the vehicle is pitched right or left on an inclined surface, and the modification to the torque application may include increasing EPAS torque to assist in climbing the inclined surface. In some cases, the controller may monitor for additional movement of the center of gravity of the vehicle relative to the axis of rotation of the vehicle responsive to the increasing EPAS torque and, in response to the center of gravity moving toward the axis of rotation, the controller may apply assist torque down the inclined surface. In an example embodiment, the controller may monitor for further movement of the center of gravity of the vehicle relative to the axis of rotation of the vehicle responsive to the controller applying the assist torque down the inclined surface and, in response to the center of gravity moving toward the axis of rotation, the controller may steer down the inclined surface.

These modifications may also be employed in the context of a method of maintaining stability of a vehicle operating on an inclined surface. An example of such a method is shown in the block diagram of FIG. 8. In this regard, the method may include receiving vehicle attitude information at operation 800, determining proximity to a stability threshold based on the vehicle attitude information at operation 810, modifying a torque application associated with propulsion or steering of the vehicle based on the proximity to the stability threshold at operation 820, determining an effect of the modifying the torque application at operation 830, and, responsive to no change or reduction in the proximity to the stability threshold, providing additional torque application modification associated with the propulsion or the steering of the vehicle at operation 840.

With reference to the situations described above relating to applying steering torque or angle to bring the vehicle to a more stable orientation, there may be circumstances that steering down a hill would be worse than steering up the hill. One such example of this may be in a situation in which the vehicle is climbing a steep hill, then begins to turn to one side (intentionally or because of uneven grip). In such a situation, to continue turning down the hill would not increase stability, but turning up the hill would increase stability. Accordingly, in some embodiments, the controller may be further configured to compare a proposed turn in up and down hill directions to determine which direction increases stability. IN such an example, the controller may then choose the action that increases stability and apply torque or steering angle in that direction.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle control system of a vehicle, the system comprising:
    a sensor network sensing vehicle attitude information; and
    a controller operably coupled to the sensor network to determine, based on the vehicle attitude information, movement of a center of gravity of the vehicle relative to an axis of rotation of the vehicle,
    wherein the controller further determines a modification to a torque application of the vehicle based on the movement of the center of gravity of the vehicle relative to the axis of rotation of the vehicle,
    wherein the controller monitors for additional movement of the center of gravity of the vehicle relative to the axis of rotation of the vehicle responsive to the modification to the torque application and, in response to the center of gravity moving toward the axis of rotation, the controller reduces propulsion torque to zero.

2. The vehicle control system of claim 1, wherein the attitude information indicates the vehicle is pitched up or down on an inclined surface, and
    wherein the modification to the torque application comprises altering a torque vectoring between wheels of a front, rear or side of the vehicle.

3. The vehicle control system of claim 1, further comprising:
    a first electric motor operably coupled to one or more wheels of a front axle of the vehicle; and
    a second electric motor operably coupled to one or more wheels of a rear axle of the vehicle,
    wherein the modification to the torque application comprises altering a torque split between the front and rear axles of the vehicle, and
    wherein the torque split is changed by maintaining total torque while:

increasing torque applied to the first electric motor and decreasing torque applied to the rear axle in response to the inclined surface having the front axle higher than the rear axle, or decreasing torque applied to the first electric motor and increasing torque applied to the rear axle in response to the inclined surface having the front axle lower than the rear axle.

4. The vehicle control system of claim 2, further comprising a lookup table and/or derived or modeled relationship defining a plurality of torque split values corresponding to respective different measured parameters associated with the attitude information.

5. The vehicle control system of claim 4, wherein respective different measured parameters include vehicle speed, pitch angle, roll or output torque.

6. The vehicle control system of claim 2, wherein the controller monitors for further movement of the center of gravity of the vehicle relative to the axis of rotation of the vehicle responsive to the reduction of the propulsion torque to zero and, in response to the center of gravity moving toward the axis of rotation, the controller directs application of torque in a reverse direction.

7. The vehicle control system of claim 6, wherein the sensor network comprises a rear camera, radar or lidar, and wherein the application of torque in the reverse direction is enabled responsive to the rear camera, radar or lidar confirming an absence of an obstructing object behind the vehicle.

8. The vehicle control system of claim 1, wherein the vehicle employs electrical power assisted steering (EPAS), wherein the attitude information indicates the vehicle is pitched right or left on an inclined surface, and wherein the modification to the torque application comprises increasing EPAS torque to assist in climbing the inclined surface.

9. The vehicle control system of claim 8, wherein the controller monitors for additional movement of the center of gravity of the vehicle relative to the axis of rotation of the vehicle responsive to the increasing EPAS torque and, in response to the center of gravity moving toward the axis of rotation, the controller applies assist torque down the inclined surface.

10. The vehicle control system of claim 9, wherein the controller monitors for further movement of the center of gravity of the vehicle relative to the axis of rotation of the vehicle responsive to the controller applying the assist torque down the inclined surface and, in response to the center of gravity moving toward the axis of rotation, the controller steers down the inclined surface.

11. A method of maintaining stability of a vehicle operating on an inclined surface, the method comprising:
receiving vehicle attitude information;
determining proximity to a stability threshold based on the vehicle attitude information;
modifying a torque application associated with propulsion or steering of the vehicle based on the proximity to the stability threshold;
determining an effect of the modifying the torque application; and
responsive to no change or reduction in the proximity to the stability threshold, providing additional torque application modification associated with the propulsion or the steering of the vehicle,
wherein providing additional torque application modification monitoring for additional movement of the center of gravity of the vehicle relative to the axis of rotation of the vehicle responsive to the modification to the torque application and, in response to the center of gravity moving toward the axis of rotation, reducing propulsion torque to zero.

12. The method of claim 11, wherein modifying the torque application comprises altering a torque split between a front axle and a rear axle of the vehicle in response to the vehicle attitude information indicating that the inclined surface is pitched up or down.

13. The method of claim 12, wherein the torque split is altered by maintaining total torque while:
increasing torque applied to the first electric motor and decreasing torque applied to the rear axle in response to the inclined surface having the front axle higher than the rear axle, or
decreasing torque applied to the first electric motor and increasing torque applied to the rear axle in response to the inclined surface having the front axle lower than the rear axle.

14. The method of claim 12, wherein altering the torque split comprises employing a lookup table defining a plurality of torque split values corresponding to respective different measured parameters associated with the vehicle attitude information to determine the torque split based on the respective different measured parameters.

15. The method of claim 11, wherein providing additional torque application modification further comprises monitoring for further movement of the center of gravity of the vehicle relative to the axis of rotation of the vehicle responsive to the reduction of the propulsion torque to zero and, in response to the center of gravity moving toward the axis of rotation, directing application of torque in a reverse direction.

16. The method of claim 11, wherein the vehicle employs electrical power assisted steering (EPAS),
wherein the vehicle attitude information indicates the vehicle is pitched right or left on an inclined surface, and
wherein modifying the torque application comprises increasing EPAS torque to assist in climbing the inclined surface.

17. The method of claim 16, wherein providing additional torque application modification further comprises monitoring for additional movement of the center of gravity of the vehicle relative to the axis of rotation of the vehicle responsive to the increasing EPAS torque and, in response to the center of gravity moving toward the axis of rotation, the applying assist torque down the inclined surface.

18. The method of claim 17, wherein providing additional torque application modification further comprises monitoring for further movement of the center of gravity of the vehicle relative to the axis of rotation of the vehicle responsive to the controller applying the assist torque down the inclined surface and, in response to the center of gravity moving toward the axis of rotation, the steering down the inclined surface.

* * * * *